United States Patent [19]

Campanini

[11] Patent Number: 4,791,553
[45] Date of Patent: Dec. 13, 1988

[54] CONTROL UNIT OF INPUT-OUTPUT INTERFACE CIRCUITS IN AN ELECTRONIC PROCESSOR

[75] Inventor: Giorgio Campanini, Bareggio, Italy

[73] Assignee: Italtel-Societa Italiana Telecomunicazioni s.p.a., Milan, Italy

[21] Appl. No.: 434,337

[22] Filed: Oct. 14, 1982

[30] Foreign Application Priority Data

Oct. 20, 1981 [IT] Italy .............................. 24565 A/81

[51] Int. Cl.$^4$ ............................................ G06F 9/46
[52] U.S. Cl. .................................. 364/200; 340/825.5
[58] Field of Search ... 364/200 MS File, 900 MS File; 340/825.5; 370/96

[56] References Cited

U.S. PATENT DOCUMENTS

| | | |
|---|---|---|
| 3,432,813 | 3/1969 | Annuziata et al. ................. 364/200 |
| 3,434,111 | 3/1969 | Schmidt et al. ..................... 364/200 |
| 3,665,415 | 5/1972 | Beard et al. ......................... 364/200 |
| 3,831,151 | 8/1974 | Jones, Jr. et al. .................... 364/200 |
| 3,848,233 | 11/1972 | Lotan et al. ......................... 364/200 |
| 3,949,371 | 4/1976 | Pederzini ............................ 364/200 |
| 4,001,784 | 1/1977 | Bardotti .............................. 364/200 |
| 4,027,290 | 6/1977 | Subrizi et al. ....................... 364/200 |
| 4,034,349 | 7/1977 | Monaco et al. ...................... 364/200 |
| 4,056,847 | 11/1977 | Marcantonio ....................... 364/200 |
| 4,159,518 | 6/1979 | Draper et al. ....................... 364/200 |
| 4,177,515 | 12/1979 | Jenkins et al. ....................... 364/200 |
| 4,261,034 | 4/1981 | Saccomano et al. ................. 364/200 |
| 4,315,314 | 2/1982 | Russo .................................. 364/200 |
| 4,470,111 | 9/1984 | Jenkins et al. ....................... 364/200 |
| 4,493,022 | 1/1985 | Nicolas et al. ....................... 364/200 |

OTHER PUBLICATIONS

IBM Technical Disclosure Bulletin, vol. 16, No. 3, Aug. 1973, pp. 874–876.
Lewis et al., "Channel Interface Priority Mechanism", IBM Technical Disclosure Bulletin, Nov. 1978, vol. 21, No. 6, pp. 2486–2490.
K. Soe Hojberg, "One Step Programmable Arbiters for Multiprocessors", Computer Design, Apr. 1978, pp. 154–156 and 158.

Primary Examiner—Gareth D. Shaw
Assistant Examiner—Jonathan C. Fairbanks
Attorney, Agent, or Firm—Herbert Dubno

[57] ABSTRACT

The control unit is arranged to handle the requests for transmission and reception interrupts (i.e. requests to the central logic unit CPU to halt its operative program in order to transmit or receive messages to or from a peripheral unit) in arrival from the input/output interface circuits, each of which is associated with a peripheral unit. To this purpose, the interface circuits are cyclically scanned to groups of n: the presence of at least one interrupt request halts the scanning and causes a request criterion to be transmitted to the central logic unit (CPU) by the control unit. The address of the peripheral unit presenting the highest priority among those of the group requiring an interrupt is written into the state register of the control unit, the address being composed of the number of the group (supplied by the scanner) and by the code generated by a priority coder. The transmission interrupts are handled separately from the reception interrupts; the DMA transfer requests (Direct Memory Access), handled by another circuit, have priority with respect to the interrupts and halt the scanning for a time slot strictly necessary to guarantee a correct transmission in the DMA transfer. The control unit is able to display and not to execute interrupt requests generated by peripheral units disabled by CPU or in case of faulty or missing peripheral units.

9 Claims, 2 Drawing Sheets

CONTROL UNIT OF INPUT-OUTPUT INTERFACE CIRCUITS IN AN ELECTRONIC PROCESSOR

FIELD OF THE INVENTION

The present invention relates to a circuit arrangement adapted to handle interrupt requests from peripheral units connected to an electronic processor.

BACKGROUND OF THE INVENTION

When a peripheral unit provides data to be supplied to the central logic unit (CPU) or is ready to receive data, it notifies the CPU thereof via an interrupt request; i.e. the CPU is requested to halt its operative program and to activate the specific routines that supervise the dialogue with the peripheral unit.

It is desirable to promptly display all the interrupt requests without the need for an excessive amount of circuitry and software.

A sequential scanning of all the peripheral units (or, more precisely, of the interface circuits in the processor, each of which is bidirectionally associated with a peripheral unit) requires excessively long access time slots, even though it enables all the peripheral units to have, sooner or later, access to the CPU.

Wide spread use has been made of the so-called "daisy-chain" structure, wherein all the requests reach the CPU via a common line. Through a second common line, separate from the previous one the, CPU sends an enabling message which is transmitted over the interface circuits according to a prefixed priority code often determined by the physical position of the interface circuit in the frame (the unit adjacent the CPU is the first to receive the message enabling it to send its own identification code to the bus, and so on). Such a structure requires a very small number of wires but presents two serious drawbacks:

a low-priority peripheral unit is seldom served;

the absence or failure of a peripheral unit (or of the corresponding interface circuit) stops the handling of the interrupt relative to the peripheral units following the defective unit in the priority chain.

OBJECT OF THE INVENTION

It is the object of the present invention to provide a circuit arrangement adapted to allow the handling of the interrupt requests generated by the interface units associated with the peripheral units of an electronic processor, with minimized access time slots for all the peripheral units and utilizing only a small number of control leads.

SUMMARY OF THE INVENTION

This object is attained with a circuit designed to identify the DMA (direct memory access) requests, by the interface circuits thus activating the circuits for DMA control, not illustrated herein as known per se.

The circuit is a control unit for input-output interface circuits in an electronic processor, which comprises a first and a second section adapted to respectively handle the transmission and reception interrupt requests generated by the interface circuits.

The first section comprises a first scanner arranged to cyclically address, via an input-output address bus, groups of n interface circuits; a first priority coder adapted to receive, via a data bus, the possible transmission interrupt requests from the n interface circuits addressed by the first scanner, and to generate a first request criterion for the CPU, as well as an indication of the interface circuit having the highest priority among those requiring an interrupt; a first state register accessible to the CPU, which is arranged to receive the code of the addressed group of interface circuits from the first scanner as well as the indication of the priority interface circuit from the first coder.

The first scanner is halted by the first request criterion and activated again upon control by the CPU.

The second section comprises a second scanner arranged to cyclically address, via the address bus, groups of n interface circuits; a memory arranged to receive the possible reception interrupt requests via the data bus from the n interface circuits addressed by the second scanner; a second priority coder adapted to be connected to the output of the memory, to be activated by the CPU and to generate a second criterion request for the CPU, as well as an indication of the interface circuit having the highest priority among those requiring the interrupt; a second state register accessible to the CPU adapted to receive the code of the addressed group of interface circuits from the second scanner and the indication of the priority interface circuit from the second coder. The read-out of the second state register performed by CPU causes the cancellation in the memory of the interrupt request emitted by the interface circuit whose indication was written in the second state register; the second scanner is halted by the second request criterion.

SPECIFIC DESCRIPTION

Figure 1:
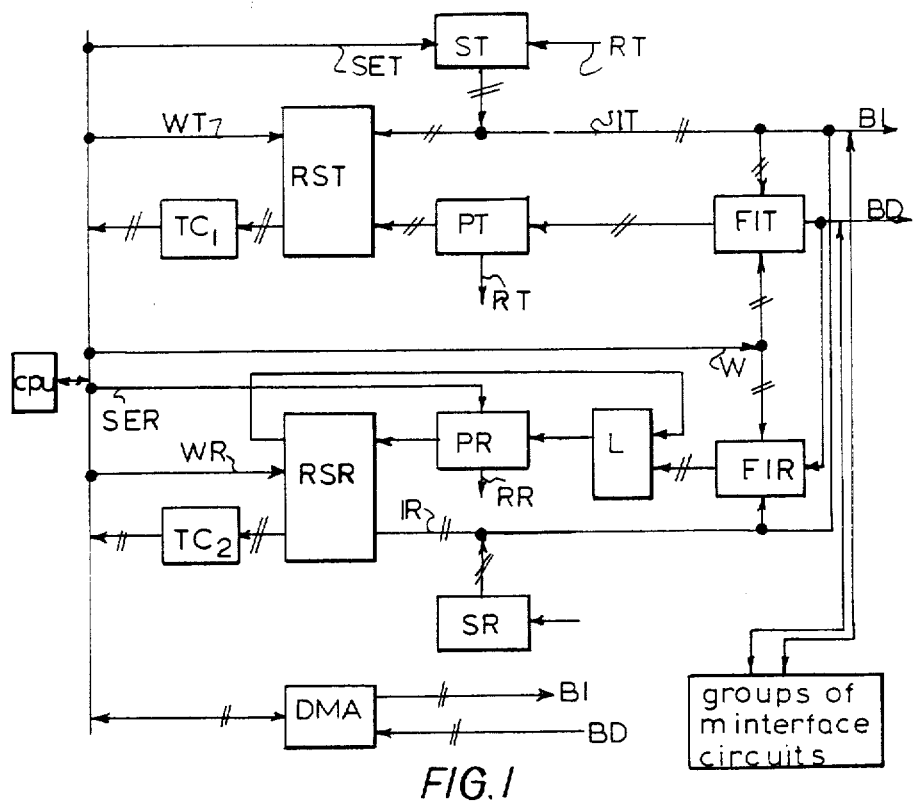
FIG. 1 is a block diagram of a control unit according to my invention.

In FIG. 1, ST indicates a first scanner adapted to address (signal IT) the transmission sections of n interface units. For this purpose, the address bus BI is utilized during the time slots in which it is not used by the central logic unit of the electronic processor (hereinafter referred to as the CPU).

The n interface units interrogated by scanner ST reply by sending in parallel over n leads of the data bus BD the various possible transmission interrupt requests, i.e. the requests for the CPU to interrupt its operative program in order to initiate the routines that supervise the transfer, via the data bus BD, of a message or data from the peripheral unit, bidirectionally associated with the interface unit which has sent the interrupt request, to the CPU or to the central memory of the processor.

The interrupt request usually consists of the condition of a flip-flop forming part of an interface circuit, which is set by the peripheral unit and reset by the CPU after the latter has received and accepted the interrupt request.

The scanning of n groups of interface circuits is particularly simple if the n interface circuits are also grouped in units, called modules, equipped with a state register and with circuits for the direct access to the central memory of the processor (DMA, Direct Memory Access).

Thus, scanner ST interrogates a module via the address bus BI, this module being designed to reply by transferring the contents of its state register into the control unit by way of data bus BD.

The n leads of data bus BD utilized in interrupt-request transmissions are connected to the inputs of a first priority coder PT that generates a code identifying, among its inputs to which a signal is applied, the one providing the highest priority according to a prefixed criterion (e.g. the position within the group or the module).

Coder PT further generates a criterion output or signal RT which halts scanner ST and reaches the CPU through an interrupt request generator (not illustrted).

The group code IT, generated by scanner ST, and the code generated by the first coder PT are written in predetermined order in a first register RST and picked up by the CPU via a control signal WT generated in response to the request criterion RT.

After handling the transmission interrupt, the CPU enables (signal SET) the first scanner ST to address the next group of n interface units.

In the same way, a second scanner SR interrogates, via bus BI, the receiving sections of the n interface units. The possible reception interrupt requests reach a memory L via data bus BD and from said memory a second priority coder PR that is analogous to the first coder PT. The second coder PR further generates a criterion RR that halts the second scanner SR and reaches the CPU through the aforesaid interrupt-request generator.

The group code IR, generated by the second scanner SR, and the code generated by the second coder PR are written in given order in a second register RSR and picked up by the CPU via a control signal WR emitted in response to the request criterion RR. When CPU picks up the contents of the second register RSR, a decoder (not illustrated) identifies the code corresponding to the request presenting the highest priority and causes its cancellation in memory L; the second coder PR, activated again by signal SER, generates the interrupt-request code already stored in L and maintains the request criterion RR.

Upon handling of the last reception interrupt stored in L by the CPU, signal SER halts the emission of the criterion request RR from the second coder PR, thus enabling the second scanner SR to address the next group of n interface circuits.

The data bus BD and the address bus BI are utilized for both transmission-interrupt and reception-interrupt requests, which cannot be obviously handled simultaneously by a control circuit realized according to the solution; a preferred embodiment provides a circuit that mainly consists of a flip-flop arranged to alternatively enable the transmitting section (ST, PT, RST) and the receiving section (L, PR, SR, RSR) of the control unit.

The DMA requests are considered as having priority by comparison with any other interrupt request and are handled by circuits (diagrammatically shown in FIG. 1 by the block DMA) that are known per se and not illustrated herein as not strictly related to the present invention in view of the purposes of the present description, it is sufficient to remember that upon identification of a reception request by DMA, the scanner is activated again automatically (without signal SER of the CPU) after the transfer of a sufficient number of bytes (e.g. two or three) to guarantee that the DMA transfer has been correctly initiated.

Not all the peripheral units (or the relative interface circuits) are always adapted to request an interrupt: some of them may be missing, faulty, or permanently or temporarily inhibited by the CPU from generating reception and/or transmission interrupt requests.

Figure 2:
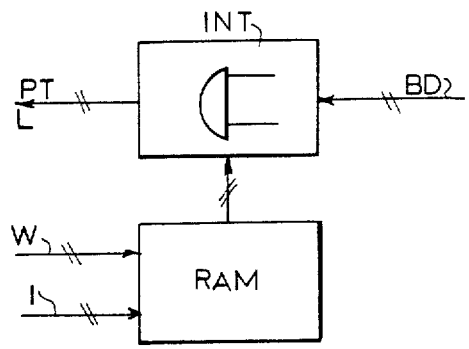
FIG. 2 is a block diagram illustrating the filtering circuits of FIG. 1.
Figure 3:
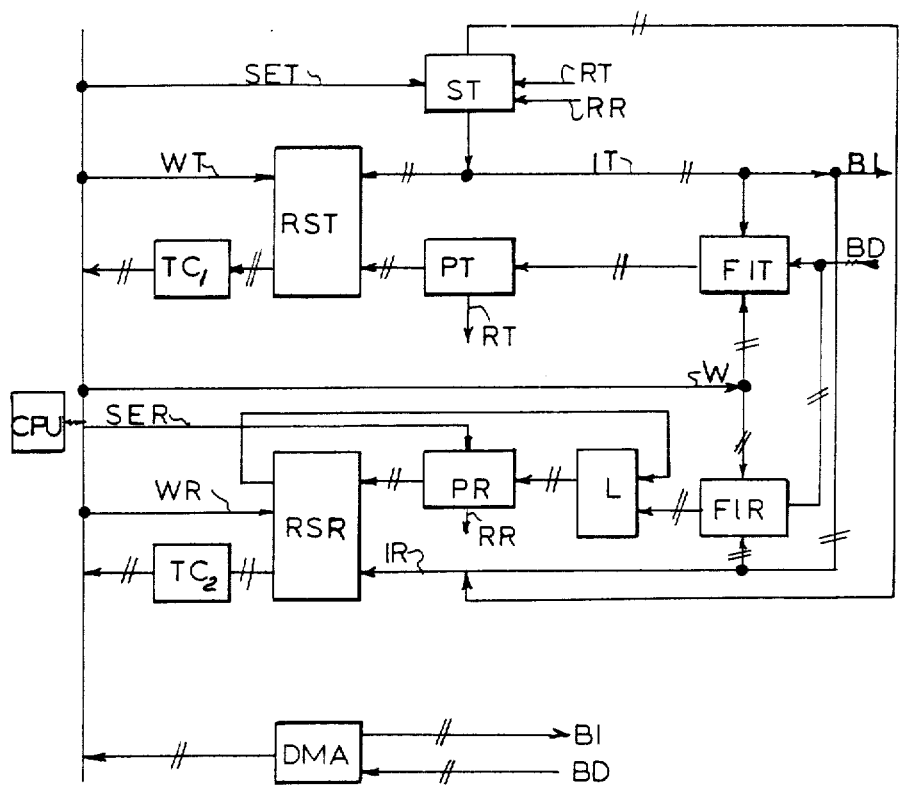
FIG. 3 is a block diagram of an embodiment using only a single scanner.

In order to avoid malfunctions due to erroneous interrupt requests corresponding to peripheral units unable to generate them for whatever reason, the control unit according to the invention solution provides that the signals from the data bus BD be filtered by means (an embodiment of which is illustrated in FIG. 2) adapted to eliminate such spurious interrupt requests.

The said means (FIT, FIR in FIG. 1) are addressed by the first scanner (ST) or the second scanner (SR) and controlled by the CPU by way of signals (data, addresses, etc.) globally labeled W in FIG. 1.

Another embodiment provides a single filtering circuit FI having the inputs connected to the data bus BD and two series of outputs respectively connected to the first coder PT and to the memory L. This embodiment is described in greater detail with reference to FIG. 2.

According to my invention, the interface units are addressed in groups of n by scanners ST and SR via the address bus BI; the address of the single interface unit is completed in the state registers RST and RSR respectively, with the code generated by priority coders PT and PR, respectively. The identification code thus obtained is not necessarily identical with that required by the CPU to identify the peripheral unit associated with the interface unit having sent an interrupt request and to act in response thereto.

Advantageously, the control unit according to the invention has a simple structure because the components (scanners, priority coders, etc.) are widely used and easily available in the market. In order to maintain such advantages and render the contents of the state registers "comprehensible" to the CPU, the circuit arrangement of FIG. 1 provides two transcoding circuits ($TC_1$, $TC_2$) connected to the outputs of the state registers (RST, RSR) which translate the address written in the state register into the code required by the CPU.

According to another possible embodiment, not illustrated in the drawing the transcoding circuits are placed before the state registers, whose contents can be therefore read out and "understood" by the CPU.

The transcoding circuits are not described in greater detail herein, since their structure strictly relates to the input and output codes and their structure is well known one of ordinary skill in the art; a possible embodiment allowed by the widespread availability of such components is that of using one or more ROM, PROM and EPROM memories addressed by the input code and the output code written in their cells.

FIG. 1 may be varied to improve its characteristics.

Scanners ST, SR are adapted to address groups of n interface units that reply in parallel via n leads of the data bus BD.

If data bus BD comprises at least 2 n leads, it is possible to check the correctness of the logic signals supplied to the control unit and therefore the correct operation of the data bus BD, by causing transmission over two leads of the logic level indicating the presence or absence of an interrupt request generated by an interface circuit, and displaying (e.g. by way of exclusive OR circuits) any difference in the received logic levels. The error signals possibly activated may be locally utilized in order to exclude, e.g. via a NAND circuit, the output of the data bus BD connected to the filtering circuits (FIT, FIR) and, more advantageously, they may be sent to the CPU as alarm signals indicating a possible failure in the data bus BD.

A rather simple way to associate the interface units with the leads of the data bus BD is to connect the i-th interface unit to the i-th and the (n+i)−th lead of the data bus BD; however, other combinations are possible, provided that the data bus BD comprise at least 2 n leads.

A greater protection against failures of the data bus BD may be obtained by sending over the lead connected to the control unit the logic level indicating the presence or absence of an interrupt request and over the other lead its reversed level (the output signal of the exclusive OR circuit is to be considered as a signal of consent) so that a failure will be signalled as a condition that keeps some or all leads of the data bus BD at a constant potential.

The task of the CPU will be that of ascertaining, through suitable diagnosis routines, if the failure concerns the data bus BD, one or more interface circuits or one or more control circuits. In the second case, the CPU can de-energize, via the signals indicated with W in FIG. 1, the damaged interface circuits.

The presence of (m.n) interface circuits (with m as any whole number) allows replacement of scanners ST and SR (having m-counting capacity) with a single scanner having 2m-counting capacity, provided that the addresses of both the receiving and the transmitting section of each interface circuit be allocated in a suitable way.

Upon the allocation of address h (h=1, ... m) to the transmitting or reception section and of address (m+h) to the receiving or transmission section, there are first examined, in groups of n, the transmission or reception interrupt requests; the allocation to the transmitting and receiving sections of the same interface circuit of an address other than 1, means that first the transmission or reception interrupt requests are examined and then the reception or transmission interrupt requests (transmission) of the same group of n interface circuits respectively, and so on.

FIG. 2 diagrammatically shows an embodiment of one of the filtering circuits FI (e.g. FIT or FIR). It mainly consists of a random-access memory (RAM) which is written by the CPU by way of the signals (data, addresses, etc.), generally labeled W in FIGS. 1 and 2 and addressed by scanners ST and/or SR (Signals I); it also consists of an inhibiting device INT controlled by the output signal of memory RAM.

Memory RAM comprises cells of n bits, whose contents represent the "filtering mask" of the interrupt requests sent by the corresponding group of interface units.

In practice, an address I (IT, IR) causes the transmission to the control unit, by way of the data bus BD, of the reception of transmission interrupt requests from a group of n interface circuits, as well as the transmission from memory RAM of the n bits present in the cell identified by the said address I.

According to a particularly simple embodiment, the inhibiting device INT comprises n gates, each of which is enabled by one of the bits generated by memory RAM to allow the transit of the logic signal available on a wire of the data bus BD.

FIG. 1 shows two distinct filtering circuits; circuit FIT is addressed by signal IT generated by the first scanner ST and its outputs are connected to the inputs of the first priority coder PT, circuit FIR is addressed by signal IR generated by the second scanner SR and its outputs are connected to the inputs of memory L.

According to a further possible embodiment, a single filtering circuit FI is used for both transmission and reception interrupts.

Its diagram is the same as that of FIG. 2 and it only differs from the one previously described in the size of the memory RAM.

As clearly shown in FIG. 1 and already stated throughout the description, both the transmitting and the receiving sections of each group of n interfact circuits are addressed by the first scanner ST or by the second scanner SR by way of the same address bus BI. Consequently, the two addresses IT and IR must be different in at least one bit.

It is therefore possible for each group of interface circuits to be associated with two separate cells of memory RAM, in one of which (addressed by signal IT) there is written the "mask" of the tranmission interrupt, and in the other of which is written the mask of the reception interrupts (addressed by signal IR).

The outputs of the n gates forming the inhibiting device INT are connected to the inputs of the first priority coder PT and of memory L. The circuit alternatively enables the transmitting and the receiving section of the control unit and causes the loading of the word of n bits available at the output of the inhibiting device INT into coder PT or into memory L.

What is claimed is:

1. A control unit for input-output interface circuits in an electronic processor, comprising a first and a second section adapted to respectively handle transmission and reception interrupt requests generated by interface circuits between a CPU forming said processor and peripheral units bidirectionally connected to the CPU by said interface circuits; the first section comprising a first scanner (ST) adapted to cyclically address, via an input-output address bus (BI), in a scanning operation, all of said interface circuits in groups of n of said interface circuits, a first priority coder (PT) connected to receive from the n interface circuits addressed by the first scanner (ST) possible transmission interrupt requests via a data bus (BD) and to generate a first request criterion (RT) for the CPU, as well as an indication of the interface circuit having the highest priority among those requiring the interrupt of each group of n interface circuits, and a first state register (RST) which is accessible to the CPU and receives from the first scanner (ST) the code of the addressed interface circuit group and from the first priority coder (PT) the indication of the interface circuit having the highest priority, the operation of the first scanner (ST) being halted by the first criterion (RT) and activated again by a first control signal (SET) from the CPU; the second section comprising a second scanner (SR) adapted to cyclically address, via the input-output address bus (BI), groups of n interface circuits, a request memory (L) connected to receive from the n interface circuits addressed by the second scanner (SR), via the data bus (BD) the possible reception interrupt requests, a second priority coder (PR) connected to an output of the memory (L) and enabled by a second control signal from the CPU to generate a second request criterion (RR) for the CPU, as well as an indication of the interface circuit having the highest priority among those requiring the reception interrupt, and a second state register (RSR) that is accessible to the CPU and receives from the second scanner (SR) the code of the addressed interface circuit group and from the second priority coder (PR) the indication of the interface circuit of highest reception priority, the readout of the second state register (RSR) by the CPU causing the cancellation in the memory (L) of the reception interrupt request generated by the interface circuit whose indication was written in the second state register (RSR), the operation of the second scanner (SR) being interrupted by the second criterion (RR), said first state register (RST) transferring an address of any interface unit of each group scanned by said first scanner (ST) to said CPU after the address of any interface unit of each group scanned by the first scanner (ST) which sends an interrupt request and has the highest priority is loaded into the first state register (RST), said data bus (BD) being connected to a filtering means (FI) addressed by the first scanner (ST) and by the second scanner (SR) and adapted to inhibit the transit of the interrupt requests from interface circuits corresponding to missing and faulty peripheral units, and corresponding to peripheral units that have been disabled by the CPU, said filtering means (FI) comprising a random access memory (RAM) written by the CPU and addressed for being read out by the first and the second scanner (ST, SR) in words of n bits, as well as an inhibiting device (INT) of n gates activated in given order by bits forming a word emitted by the random access memory (RAM) and having inputs connected to n leads forming part of the data bus (BD) and outputs connected to inputs of the first priority coder (PT) and of the request memory (L); the addressing of the random access memory (RAM) by the first scanner (ST) involving the loading of the signals available at outputs of the inhibiting device (INT) into the first priority coder (PT), the addressing of the random access memory (RAM) by the second scanner (SR) involving the loading of the signals available at an output of the inhibiting device (INT) into the request memory (L).

2. A control unit for input-output interface circuits in an electronic processor, comprising a first and a second section adapted to respectively handle transmission and reception interrupt requests generated by interface circuits between a CPU forming said processor and peripheral units bidirectionally connected to the CPU by said interface circuits; the first section comprising a first scanner (ST) adapted to cyclically address, via an input-output address bus (BI), in a scanning operation, all of said interface circuits in groups of n of said interface circuits, a first priority coder (PT) connected to receive from the n interface circuits addressed by the first scanner (ST) possible transmission interrupt requests via a data bus (BD) and to generate a first request criterion (RT) for the CPU, as well as an indication of the interface circuit having the highest priority among those requiring the interrupt of each group of n interface circuits, and a first state register (RST) which is accessible to the CPU and receives from the first scanner (ST) the code of the addressed interface circuit group and from the first priority coder (PT) the indication of the interface circuit having the highest priority, the operation of the first scanner (ST) being halted by the first criterion (RT) and activated again by a first control signal (SET) from the CPU the second section comprising a second scanner (SR) adapted to cyclically address, via the input-output address bus (BI), groups of n interface circuits, a memory (L) connected to receive from the n interface circuits addressed by the second scanner (SR), via the data bus (BD) the possible reception interrupt requests, a second priority coder (PR) connected to an output of the memory (L) and enabled by a second control signal from the CPU to generate a second request criterion (RR) for the CPU, as well as an indication of the interface circuit having the highest priority among those requiring the reception interrupt, and a second state register (RSR) that is accessible to the CPU and receives from the second scanner (SR) the code of the addressed interface circuit group and from the second priority coder (PR) the indication of the interface circuit of highest reception priority, the readout of the second state register (RSR) by the CPU causing the cancellation in the memory (L) of the reception interruption request generated by the interface circuit whose indication was written in the second state register (RSR), operation of the second scanner (SR) being interrupted by the second criterion (RR), said first state register (RST) transferring an address of any interface unit of each group scanned by said first scanner (ST) to said CPU after the address of any interface unit of each group scanned by the first scanner (ST) which sends an interrupt request and has the highest priority is loaded into the first state register (RST), said data bus (BD) being connected to a filtering means (FI) addressed by the first scanner (ST) and by the second scanner (SR) and adapted to inhibit the transit of the interrupt requests from interface circuits corresponding to missing and faulty peripheral units, and corresponding to peripheral units that have been disabled by the CPU, said filtering means (FI) comprising a first and a second random access memory (RAM) both written by the CPU and addressed for being read out by the first scanner (ST) and the second scanner (SR), respectively, the said random access memories (RAM) being arranged in words of n bits, and two inhibiting devices (INT) each comprising n gates having both inputs and outputs activated in given order by the n bits forming the words emitted by the first and the second random access memory (RAM), respectively, the inputs of said gates being connected in given order to n leads forming part of the data bus (BD) and the outputs being respectively connected to inputs of the first priority coder (PT) and of the request memory (L).

3. A control unit for input-output interface circuits in an electronic processor, comprising a first and a second section adapted to respectively handle transmission and reception interrupt requests generated by interface circuits between a CPU forming said processor and peripheral units bidirectionally conencted to the CPU by said interface circuits; the first section comprising a first scanner (ST) adapted to cyclically address, via an input-output address bus (BI), in a scanning operation, all of said interface circuits in groups of n of said interface circuits, a first priority coder (PT) connected to receive from the n interface circuits addressed by the first scanner (ST) possible transmission interrupt requests via a data bus (BD) and to generate a first request criterion (RT) for the CPU, as well as an indication of the interface circuit having the highest priority among those requiring the interrupt of each group of n interface circuits, and a first state register (RST) which is accessible to the CPU and receives from the first scanner (ST) the code of the addressed interface circuit group and from the first priority coder (PT) the indication of the interface circuit having the highest priority, the operation of the first scanner (ST) being halted by the first criterion (RT) and activated again by a first control signal (SET) for the CPU; the second section comprising a second scanner (SR) adapted to cyclically address, via the input-output address bus (BI), groups of n interface circuits, a memory (L) connected to receive from the n interface circuits addressed by the second scanner (SR), via the data bus (BD) the possible reception interrupt requests, a second priority coder (PR) connected to an output of the memory (L) and enabled by a second control signal from the CPU to generate a second request criterion (RR) for the CPU, as well as an indication of the interface circuit having the highest priority among those requiring the reception interrupt, and a second state register (RSR) that is accessible to the CPU and receives from the second scanner (SR) the code of the addressed interface circuit group and from the second priority coder (PR) the indication of the interface circuit of highest reception priority, the readout of the second state register (RSR) by the CPU causing the cancellation in the memory (L) of the reception interrupt request generated by the interface circuit whose indication was written in the second state register (RSR), the operation of the second scanner (SR) being interrupted by the second criterion (RR), said first state register (RST) transferring an address of any interface unit of each group scanned by said first scanner (ST) to said CPU after the address of any interface unit of each group scanned by the first scanner (ST) which sends an interrupt request and has the highest priority is loaded into the first state register (RST), transcoding circuits (TC$_1$, TC$_2$) being arranged to transfer an identification code of a selected peripheral unit generated by the scanner and by the priority coder (ST and PT, SR and PR, respectively) into an identification code of the selected peripheral unit required by the CPU to communicate with the selected peripheral unit, inputs of the transcoding circuits (TC$_1$, TC$_2$) being connected to outputs of the scanner and of the priority coder (ST, PT and SR, PR, respectively) and outputs of said transcoding circuits being connected to inputs of the first state register (RST) and of the second (RSR) state register.

4. A control unit for input-output interface circuits in an electronic processor, comprising a first and a second section adapted to respectively handle transmission and reception interrupt requests generated by interface circuits between a CPU forming said processor and peripheral units bidirectionally connected to the CPU by said interface circuits; the first section comprising a first scanner (ST) adapted to cyclically address, via an input-output address bus (BI), in a scanning operation, all of said interface circuits in groups of n of said interface circuits, a first priority coder (PT) connected to receive from the n interface circuits addressed by the first scanner (ST) possible transmission interrupt requests via a data bus (BD) and to generate a first request criterion (RT) for the CPU, as well as an indication of the interface circuit having the highest priority among those requiring the interrupt of each group of n interface circuits, and a first state register (RST) which is accessible to the CPU and receives from the first scanner (ST) the code of the addressed interface circuit group and from the first priority coder (PT) the indication of the interface circuit having the highest priority, the operation of the first scanner (ST) being halted by the first criterion (RT) and activated again by a first control signal (SET) for the CPU; the second section comprising a second scanner (SR) adapted to cyclically address, via the input-output address bus (BI), groups of n interface circuits, a memory (L) connected to receive from the n interface circuits addressed by the second scanner (SR), via the data bus (BD) the possible reception interrupt requests, a second priority coder (PR) connected to an output of the memory (L) and enabled by a second control signal from the CPU to generate a second request criterion (RR) for the CPU, as well as an indication of the interface circuit having the highest priority among those requiring the reception interrupt, and a second state register (RSR) that is accessible to the CPU and receives from the second scanner (SR) the code of the addressed interface circuit group and from the second priority coder (PR) the indication of the interface circuit of highest reception priority, the readout of the second state register (RSR) by the CPU causing the cancellation in the memory (L) of the reception interrupt request generated by the interface circuit whose indication was written in the second state register (RSR), the operation of the second scanner (SR) being interrupted by the second criterion (RR), said first state register (RST) transferring an address of any interface unit of each group scanned by said first scanner (ST) to said CPU after the address of any interface unit of each group scanned by the first scanner (ST) which sends an interrupt request and has the highest priority is loaded into the first state register (RST), transcoding circuits (TC$_1$, TC$_2$) being arranged to transfer an identification code of a selected peripheral unit generated by the scanner and by the priority coder (ST and PT, SR and PR, respectively) into an identification code of the selected peripheral unit required by the CPU to communicate with the selected peripheral unit, inputs of the transcoding circuits (TC$_1$ and TC$_2$), respectively) being connected to outputs of the first state register (RST) and of the second (RSR) state register, respectively, and outputs of said transcoding circuits (TC$_1$ and TC$_2$) being connected to the CPU.

5. The control unit defined in claim 1 wherein said CPU has (m+n) interface units, h (h−1, . . . 0.2m−1) being an address of a transmitting or receiving section of a given interface unit and (h+1) being an address of the corresponding receiving or transmitting section, respectively, and wherein a single scanner having a 2m-counting capacity is used, as said first scanner (ST) and as the second scanner (SR).

6. A control unit for input-output interface circuits in an electronic processor, comprising a first and a second section adapted to respectively handle transmission and reception interrupt requests generated by interface circuits between a CPU forming said processor and peripheral units bidirectionally connected to the CPU by said interface circuits; the first section comprising a first scanner (ST) adapted to cyclically address, via an input-output address bus (BI), groups of n of said interface circuits, a first priority coder (PT) connected to receive from the n interface circuits addressed by the first scanner (ST) from the n interface circuits addressed by the first scanner (ST) possible transmission interrupt requests via a data bus (BD) and to generate a first request criterion (RT) for the CPU, as well as an indication of the interface circuit having the highest priority among those requiring the interrupt, and a first state register (RST) which is accessible to the CPU and receives from the first scanner (ST) the code of the addressed interface circuit group and from the first priority coder (PT) the indication of the interface circuit having the highest priority, the operation of the first scanner (ST) being halted by the first criterion (RT) and activated again by a first control signal (SET) for the CPU; the second section comprising a second scanner (SR) adapted to cyclically address, via the input-output address bus (BI), groups of n interface circuits, a memory (L) connected to receive from the n interface circuits addressed by the second scanner (SR), via the data bus (BD) the possible reception interrupt requests, a second priority coder (PR) connected to an output of the memory (L) and enabled by a second control signal (SER) from the CPU to generate a second request criterion (RR) for the CPU, as well as an indication of the interface circuit having the highest priority among those requiring the reception interrupt, and a second state register (RSR) that is accessible to the CPU and receives from the second scanner (SR) the code of the addressed interface circuit group and from the second priority coder (PR) the indication of the interface circuit of highest reception priority, the read-out of the second state register (RSR) by the CPU causing the cancellation in the memory (L) of the reception interrupt request generated by the interface circuit whose indication was written in the second state register (RSR), the operation of the second scanner (SR) being interrupted by the second criterion (RR), wherein the data bus (BD) is connected to a filtering means (FI) addressed by the first scanner (ST) and by the second scanner (SR) and adapted to inhibit the transit of the interrupt requests from interface circuits corresponding to missing and faulty peripheral units and corresponding to peripheral units that have been disabled by the CPU, said first state register (RST) transferring an address of any interface unit of each group scanned by said first scanner (ST) to said CPU after the address of any interface unit of each group scanned by the first scanner (ST) which sends an interrupt request and has the highest priority is loaded into the first state register (RST), transcoding circuits (TC$_1$, TC$_2$) being arranged to transform an indentification code of a selected peripheral unit generated by the scanner and by the priority coder (ST and PT, SR and PR), respectively) into an identification code of the selected peripheral unit required by the CPU to communicate with the selected peripheral unit, inputs of the transcoding circuits (TC$_1$, TC$_2$) being connected to outputs of the scanner and of the priority coder (ST, PT and SR, PR, respectively) and outputs of said transcoding circuits (TC$_1$ and TC$_2$) being connected to inputs of the first state register (RST) and of the second (RSR) state register.

7. A control unit for input-output interface circuits in an electronic processor, comprising a first and a second section adapted to respectively handle transmission and reception interrupt requests generated by interface circuits between a CPU forming said processor and peripheral units bidirectionally connected to the CPU by said interface circuits; the first section comprising a first scanner (ST) adapted to cyclically address, via an input-output address bus (BI), groups of n of said interface circuits, a first priority coder (PT) connected to receive from the n interface circuits addressed by the first scanner (ST) from the n interface circuits addressed by the first scanner (ST) possible transmission interrupt requests via a data bus (BD) and to generate a first request criterion (RT) for the CPU, as well as an indication of the interface circuit having the highest priority among those requiring the interrupt, and a first state register (RST) which is accessible to the CPU and receives from the first scanner (ST) the code of the addressed interface circuit group and from the first priority coder (PT) the indication of the interface circuit having the highest priority, the operation of the first scanner (ST) being halted by the first criterion (RT) and activated again by a first control signal (SET) for the CPU; the second section comprising a second scanner (SR) adapted to cyclically address, via the input-output address bus (BI), groups of n interface circuits, a memory (L) connected to receive from the n interface circuits addressed by the second scanner (SR), via the data bus (BD) the possible reception interrupt requests, a second priority coder (PR) connected to an output of the memory (L) and enabled by a second control signal (SER) from the CPU to generate a second request criterion (RR) for the CPU, as well as an indication of the interface circuit having the highest priority among those requiring the reception interrupt, and a second state register (RSR) that is accessible to the CPU and receives from the second scanner (SR) the code of the addressed interface circuit group and from the second priority coder (PR) the indication of the interface circuit of highest reception priority, the read-out of the second state register (RSR) by the CPU causing the cancellation in the memory (L) of the reception interrupt request generated by the interface circuit whose indication was written in the second state register (RSR), the operation of the second scanner (SR) being interrupted by the second criterion (RR), wherein the data bus (BD) is connected to a filtering means (FI) addressed by the first scanner (ST) and by the second scanner (SR) and adapted to inhibit the transit of the interrupt requests from interface circuits corresponding to missing and faulty peripheral units and corresponding to peripheral units that have been disabled by the CPU, said first state register (RST) transferring an address of any interface unit of each group scanned by said first scanner (ST) to said CPU after the address of any interface unit of each group scanned by the first scanner (ST) which sends an interrupt request and has the highest priority is loaded into the first state register (RST), transcoding circuits (TC$_1$, TC$_2$) being arranged to transform an indentification code of a selected peripheral unit generated by the scanner and by the priority coder (ST and PT, SR and PR, respectively) into an identification code of the selected peripheral unit required by the CPU to communicate with the selected peripheral unit, inputs of the transcoding circuits (TC$_1$ and TC$_2$, respectively) being connected to outputs of the first state register (RST) and of the second (RSR) state register, respectively, and outputs of said transcoding circuits (TC$_1$ and TC$_2$) being connected to the CPU.

8. A control unit for input-output interface circuits in an electronic processor, comprising a first and a second section adapted to respectively handle transmission and reception interrupt requests generated by interface circuits between a CPU forming said processor and peripheral units bidirectionally connected to the CPU by said interface circuits, the first section comprising a first scanner (ST) adapted to cyclically address, via an input-output address bus (BI), groups of n of said interface circuits, a first priority coder (PT) connected to receive from the n interface circuits addressed by the first scanner (ST) possible transmission interrupt requests via a data bus (BD) and to generate a first request criterion (RT) for the CPU, as well as an indication of the interface circuit having the highest priority among those requiring the interrupt, and a first state register (RST) which is accessible to the CPU and receives from the first scanner (ST) the code of the addressed interface circuit group to and from the first priority coder (PT)

the indication of the interface circuit having the highest priority, the operation of the first scanner (ST) being halted by the first criterion (RT) and activated again by a first control signal (SET) from the CPU; the second section comprising a second scanner (SR) adapted to cyclically address, via the input-output address bus (BI), groups of n interface circuits, a request memory (L) connected to receive from the n interface circuits addresssed by the second scanner (SR), via the data bus (BD) the possible reception interrupt requests, a second priority coder (PR) connected to an output of the memory (L and enabled by a second control (SER) from the SPU to generate a second request criterion (RR) for the CPU, as well as an indication of the interface circuit having the highest priority among those requiring the reception interrupt, and a second state register (RSR) that is accessible to the CPU and receives from the second scanner (SR) the code of the addressed interface circuit group and from the second priority coder (PR) the indication of the interface circuit of highest reception priority, the readout of the second state register (RSR) by the CPU causing the cancellation in the memory (L) of the reception interrupt request generated by the interface circuit whose indication was written in the second state register (RSR), the operation of the second scanner (SR) being interrupted by the second criterion (RR), wherein the data bus (BD) is connected to a filtering means (FI) addressed by the first scanner (ST) and by the second scanner (SR) and adapted to inhibit the transit of the interrupt requests from interface circuits corresponding to missing and faulty peripheral units and corresponding to peripheral units that have been disabled by the CPU, said first state register (RST) transferring an address of any interface unit of each group scanned by said first scanner (ST) to said CPU after the address of any interface unit of each group scanned by the first scanner (ST) which sends an interrupt request and has the highest priority is loaded into the first state register (RST), said filtering means (FI) comprising a random access memory (RAM) written by the CPU and addressed for being read out by the first and the second scanner (ST, SR) in words of n bits, as well as an inhibiting device (INT) of n gates activated in a given order by bits forming a word emitted by the random access memory (RAM) and having inputs connected to n leads forming part of the data bus (BD) and outputs connected to inputs of the first priority coder (PT) and of the request memory (L); the addressing of the random access memory (RAM) by the first scanner (ST) involving the loading of the signals available at outputs of the inhibiting device (INT) into the first priority coder (PT), the addressing of the random access memory (RAM) by the second scanner (SR) involving the loading of the signals available at an output of the inhibiting device (INT) in the request memory (L).

9. A control unit for input-output interface circuits in an electronic processor, comprising a first and a second section adapted to respectively handle transmission and reception interrupt requests generated by interface circuits between a CPU forming said processor and peripheral units bidirectionally connected to the CPU by said interface circuits, the first section comprising a first scanner (ST) adapted to cyclically address, via an input-output address bus (BI), groups of n of said interface circuits, a first priority coder (PT) connected to receive from the n interface circuits addressed by the first scanner (ST) possible transmission interrupt requests via a data bus (BD) and to generate a first request criterion (RT) for the CPU, as well as an indication of the interface circuit having the highest priority among those requiring the interrupt, and a first state register (RST) which is accessible to the CPU and receives from the first scanner (ST) the code of the addressed interface circuit group to and from the first priority coder (PT) the indication of the interface circuit having the highest priority, the operation of the first scanner (ST) being halted by the first criterion (RT) and activated again by a first control signal (SET) from the CPU; the second section comprising a second scanner (SR) adapted to cyclically address, via the input-output address bus (BI), groups of n interface circuits, a request memory (L) connected to receive from the n interface circuits addressed by the second scanner (SR), via the data bus (BD) the possible reception interrupt requests, a second priority coder (PR) connected to an output of the memory (L) and enabled by a second control (SER) from the SPU to generate a second request criterion (RR) for the CPU, as well as an indication of the interface circuit having the highest priority among those requiring the reception interrupt, and a second state register (RSR) that is accessible to the CPU and receives from the second scanner (Sr) the code of the addressed interface circuit group and from the second priority coder (PR) the indication of the interface circuit of highest reception priority, the readout of the second state register (RSR) by the CPU causing the cancellation in the memory (L) of the reception interrupt request generated by the interface circuit whose indication was written in the second state register (RSR), the operation of the second scanner (SR) being interrupted by the second criterion (RR), wherein the data bus (BD) is connected to a filtering means (FI) addressed by the first scanner (ST) and by the second scanner (SR) and adapted to inhibit the transit of the interrupt requests from interface circuits corresponding to missing and faulty peripheral units and corresponding to peripheral units that have been disabled by the CPU, said first state register (RST) transferring an address of any interface unit of each group scanned by said first scanner (ST) to said CPU after the address of any interface unit of each group scanned by the first scanner (ST) which sends an interrupt request and has the highest priority is loaded into the first state register (RST), said filtering means (FI) comprising a first and a second random access memory (RAM) both written by the CPU and addressed for being read out by the first scanner (ST) and the second scanner (SR), respectively, random access memories (RAM) being arranged in words of n bits, and two inhibiting devices (INT) each comprising n gates activated in a given order by the n bits forming the words emitted by the first and the second random access memory (RAM), respectively, the inputs of the said gates being connected in given order to n leads forming part of the data bus (BD) and the outputs being respectively connected to inputs of the first priority coder (PT) and of the request memory (L), priority coder (PT), the addressing of the random access memory (RAM) by the second scanner (SR) involving the loading of the signals available at an output of the inhibiting device (INT) in the request memory (L).

* * * * *